(12) United States Patent
Lin et al.

(10) Patent No.: US 9,819,450 B2
(45) Date of Patent: Nov. 14, 2017

(54) METHOD AND DEVICE FOR SENDING AND RECEIVING ACKNOWLEDGEMENT FEEDBACK INFORMATION

(71) Applicant: China Academy of Telecommunications Technology, Beijing (CN)

(72) Inventors: Yanan Lin, Beijing (CN); Zukang Shen, Beijing (CN); Xuejuan Gao, Beijing (CN); Qianqian Si, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 155 days.

(21) Appl. No.: 14/652,390

(22) PCT Filed: Dec. 26, 2013

(86) PCT No.: PCT/CN2013/090568
§ 371 (c)(1),
(2) Date: Jun. 15, 2015

(87) PCT Pub. No.: WO2014/101796
PCT Pub. Date: Jul. 3, 2014

(65) Prior Publication Data
US 2015/0333871 A1 Nov. 19, 2015

(30) Foreign Application Priority Data
Dec. 28, 2012 (CN) .......................... 2012 1 0587672

(51) Int. Cl.
*H04L 5/14* (2006.01)
*H04L 1/16* (2006.01)
(Continued)

(52) U.S. Cl.
CPC .................. *H04L 1/16* (2013.01); *H04J 4/00* (2013.01); *H04L 1/1854* (2013.01);
(Continued)

(58) Field of Classification Search
None
See application file for complete search history.

(56) References Cited

U.S. PATENT DOCUMENTS

2011/0305161 A1* 12/2011 Ekpenyong ........... H04L 1/0031
370/252
2012/0307821 A1* 12/2012 Kwon ..................... H04L 5/001
370/350
(Continued)

FOREIGN PATENT DOCUMENTS

CN    101868028    10/2010
CN    102082625    6/2011
(Continued)

OTHER PUBLICATIONS

Extended European Search Report for EP Patent Application No. 13868681.1 dated Nov. 20, 2015.
(Continued)

*Primary Examiner* — Ayaz Sheikh
*Assistant Examiner* — Tarell Hampton
(74) *Attorney, Agent, or Firm* — Foley & Lardner LLP

(57) ABSTRACT

Disclosed are a method and a device for sending and receiving acknowledgement feedback information, which relate to the field of wireless communications, and are applicable to solving the problem of transmitting acknowledgement feedback information of downlink data in the case of aggregation of a time division duplex (TDD) carrier and a frequency division duplex (FDD) carrier. In this solution, a terminal receives configuration signaling sent by a network side, where the configuration signaling instructs to divide M downlink carriers for carrier aggregation into information
(Continued)

about N downlink carrier groups, and to configure one uplink carrier for each downlink carrier group; the uplink carrier used for sending acknowledgement feedback information corresponding to downlink data is determined according to the configuration signaling, and the acknowledgement feedback information corresponding to the downlink data is sent to the network side according to a determination result after the downlink data is received. This application solves the problem of how to receive acknowledgement feedback information in the case of aggregation of the TDD carrier and the FDD carrier.

12 Claims, 4 Drawing Sheets

(51) Int. Cl.
H04J 4/00 (2006.01)
H04W 72/04 (2009.01)
H04L 1/18 (2006.01)
H04L 5/00 (2006.01)
H04W 84/04 (2009.01)

(52) U.S. Cl.
CPC ............ *H04L 1/1861* (2013.01); *H04L 5/001* (2013.01); *H04L 5/0055* (2013.01); *H04L 5/14* (2013.01); *H04L 5/1469* (2013.01); *H04W 72/042* (2013.01); *H04W 72/0453* (2013.01); *H04W 84/042* (2013.01)

(56) References Cited

U.S. PATENT DOCUMENTS

| | | | | |
|---|---|---|---|---|
| 2013/0010684 A1* | 1/2013 | Park | ................ | H04L 5/0003 370/315 |
| 2013/0250822 A1* | 9/2013 | Yang | ................ | H04L 5/001 370/280 |
| 2014/0029489 A1* | 1/2014 | Han | ................ | H04L 5/001 370/280 |
| 2014/0376425 A1* | 12/2014 | Han | ................ | H04W 74/0866 370/280 |
| 2015/0131536 A1* | 5/2015 | Kaur | ................ | H04L 5/001 370/329 |

FOREIGN PATENT DOCUMENTS

| | | |
|---|---|---|
| CN | 102469599 | 5/2012 |
| CN | 102752085 A | 10/2012 |
| WO | WO-2011119248 | 9/2011 |
| WO | WO-2012/142973 | 10/2012 |
| WO | WO-2012/161510 | 11/2012 |

OTHER PUBLICATIONS

International Search Report for PCT/CN2013/090568 dated Feb. 27, 2014.

* cited by examiner

METHOD AND DEVICE FOR SENDING AND RECEIVING ACKNOWLEDGEMENT FEEDBACK INFORMATION

This application is a US National Stage of International Application No. PCT/CN2013/090568, filed on 26 Dec. 2013, designating the United States, and claiming the benefit of Chinese Patent Application No. 201210587672.8, filed with the Chinese Patent Office on Dec. 28, 2012 and entitled "Method and device for transmitting and receiving feedback information", which is hereby incorporated by reference in its entirety.

FIELD

The present invention relates to the field of wireless communications and particularly to a method and device for transmitting and receiving feedback information.

BACKGROUND

Three duplex modes are currently supported by a Long Term Evolution (LTE) system: the Frequency Division Duplex (FDD) mode as illustrated in FIG. 1A, the Half-Frequency Division Duplex (H-FDD) mode as illustrated in FIG. 1B, and the Time Division Duplex (TDD) mode as illustrated in FIG. 1C.

Here the FDD refers to uplink transmission and downlink transmission in different carrier frequency bands to allow simultaneous reception and transmission by an evolved Node B (eNB) and a User Equipment (UE). To support simultaneous reception and transmission, the FDD devices need to be provided with two sets of transceivers and duplex filters. The H-FDD differs from the FDD in that the UE does support simultaneous reception and transmission, that is, the eNB in the H-FDD is the same as the eNB in the FDD, but the UE in the H-FDD can be simplified relative to the UE in the FDD by maintaining only one of the sets of transceivers and saving a cost of the duplex filters. The TDD refers to uplink transmission and downlink transmission in the same carrier frequency band to allow transmission (reception) or reception (transmission) of a channel by the eNB (UE) respectively in different periods of time.

There is only one carrier in a cell in the LTE and earlier wireless communication systems, and there is a bandwidth up to 20 MHz in the LTE system, as illustrated in FIG. 2.

In a Long Term Evolution-Advanced (LTE-A) system, there are required peak rates of the system, up to 1 Gbps in the downlink and 500 Mbps in the uplink, as improved significantly over the LTE system. The required peak rates can not be available with only one carrier with a bandwidth up to 20 MHz. It is thus necessary in the LTE-A system to extend a bandwidth available to the UE, and in view of this, the technology of Carrier Aggregation (CA) has been introduced where a plurality of contiguous or non-contiguous carriers served by the same eNB (eNB) are aggregated together to serve the UE concurrently with a desirable rate. These carriers aggregated together are also referred to as Component Carriers (CCs). Each cell can be a component carrier, and cells (component carriers) served by different eNBs can not be aggregated. In order to ensure the UE in the LTE to be able to operate over each of the aggregated carriers, there is a bandwidth of no more than 20 MHz for each of the carriers. FIG. 3 illustrates the CA technology in the LTE-A.

There are four carriers, served by the eNB in the LTE-A system illustrated in FIG. 3, which can be aggregated, and over which the eNB can transmit data concurrently with the UE to thereby improve the throughput of the system.

At present, no carrier aggregation across the systems can be supported in the LTE, that is, an FDD carrier can only be aggregated with an FDD carrier, and a TDD carrier can only be aggregated with a TDD carrier.

In the LTE system, a radio frame is of 10 ms and a subframe is of 1 ms in both the FDD mode and the TDD mode. Seven TDD uplink/downlink configurations are defined for one TDD radio frame, as depicted in Table 1 below, where D represents a downlink (DL) subframe, U represents an uplink (UL) subframe, and S represents a special subframe of the TDD system.

TABLE 1

| Uplink/ downlink config- uration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 7 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the LTE FDD system, the UE receives downlink data in a subframe (n−4), then feeds back signaling of whether data received in the downlink subframe (n−4) needs to be retransmitted, that is, feeds back Acknowledgement/Negative Acknowledgement (ACK/NACK) information, in an uplink subframe n. When carriers are aggregated, ACK/NACK information corresponding to a plurality of downlink carriers in the subframe n−4 will be fed back concurrently in the uplink subframe n.

In the LTE TDD system, the UE may feed back, ACK/NACK information corresponding to multiple downlink subframes, in one uplink subframe, that is, the UE detects transmission of a Physical Downlink Shared Channel (PDSCH), or a Physical Downlink Control Channel (PDCCH) indicating downlink semi-persistent scheduling release, in a downlink subframe (n−k) and feeds back corresponding ACK/NACK information in an uplink subframe n, where k∈K, and values in the set K depend upon the TDD uplink/downlink configuration of the system, and the particular subframe number, as depicted in Table 2. Especially, there is no ACK/NACK feedback for the special subframe when the special subframe configuration 0 and 5 are used for normal Cyclic Prefix (CP) and the special subframe configuration 0 and 4 are used for extended CP, that is, the UE will not feed back ACK/NACK for special subframe.

TABLE 2

| Uplink/ downlink Config- uration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE 2-continued

| Uplink/downlink Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 2, a plurality of radio frames are arranged in order, that is, if the last subframe in the radio frame a is k, then the first subframe in the radio frame a+1 is k+1, and Table 2 depicts K corresponding to respective uplink subframes taking only one radio frame as an example, where n−k<0 indicates a downlink subframe in a preceding radio frame.

In summary, there has been absent so far a solution to feeding back ACK/NACK information for downlink data, applicable to carrier aggregation with carriers in the TDD system and carriers the FDD system.

SUMMARY

Embodiments of the invention provide a method and device for transmitting and receiving feedback information so as to address the problem of how to transmit feedback information for downlink data in the case of carrier aggregation with at least one TDD carrier and at least one FDD carrier.

A method for transmitting feedback information, applicable to carrier aggregation with at least one TDD carrier and at least one FDD carrier, includes:

receiving, by a UE, configuration signaling transmitted by the network side, wherein the configuration signaling indicates information about grouping of M downlink carriers aggregated in the carrier aggregation into N groups, wherein each group includes at least one downlink carrier among the M downlink carriers, and the same duplex mode is applied to downlink carriers belonging to a group; and the configuration signaling further configures each group with an uplink carrier, wherein the same duplex mode as a downlink carrier in a group is applied to the uplink carrier configured for the group; and M represents a positive integer, and N represents a positive integer no more than M;

determining, by the UE, at least one uplink carrier for transmitting feedback information corresponding to downlink data, according to the configuration signaling; and receiving, by the UE, the downlink data and transmitting the feedback information corresponding to the downlink data to the network side according to a result of determination.

In the solution according to the embodiment of the invention, at the UE side, the UE receives configuration signaling transmitted by the network side, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M; the UE determines at least one uplink carrier for transmitting feedback information corresponding to downlink data, according to the configuration signaling; and the UE transmits the feedback information corresponding to the downlink data to the network side according to a result of determination upon reception of the downlink data. As can be apparent, this method enables a solution to transmitting by the UE feedback information corresponding to downlink data, applicable to carrier aggregation with at least one TDD carrier and at least one FDD carrier, so as to address the problem of how to transmit feedback information in the case of carrier aggregation with at least one TDD carrier and at least one FDD carrier.

Preferably when the TDD duplex mode is applied to downlink carriers in a group, the same TDD uplink/downlink configuration is applied to all the downlink carriers in the group.

Preferably determining the at least one uplink carrier for transmitting the feedback information corresponding to the downlink data, according to the configuration signaling is performed by determining that the feedback information corresponding to the downlink data transmitted in a group is to be transmitted over the uplink carrier configured for the group.

Preferably determining the at least one uplink carrier for transmitting the feedback information corresponding to the downlink data, according to the configuration signaling is performed by determining that the feedback information corresponding to all the downlink data transmitted in first category of groups is to be transmitted over an uplink carrier C' in an uplink subframe n, wherein the first category consists of any group for which feedback information is to be transmitted in the uplink subframe n; and the uplink carrier C' is an uplink carrier configured for a group with the highest priority in the first category.

Furthermore the configuration signaling further indicates priority information of each group; and the UE determines the priority of the at least one group of the first category according to the configuration signaling; or the UE determines the priority of the at least one group of the first category as the UE prescribes with the network side.

A method for receiving feedback information, applicable to carrier aggregation with at least one TDD carrier and at least one FDD carrier, includes:

transmitting, by the network side, configuration signaling to a UE, wherein the configuration signaling indicates information about grouping of M downlink carriers aggregated in the carrier aggregation into N groups, wherein each group includes at least one downlink carrier among the M downlink carriers, and the same duplex mode is applied to downlink carriers belonging to a group; and the configuration signaling further configures each group with an uplink carrier, wherein the same duplex mode as a downlink carrier in a group is applied to the uplink carrier configured for the group; and M represents a positive integer, and N represents a positive integer no more than M;

determining, by the network side, at least one uplink carrier for transmitting by the UE feedback information corresponding to downlink data, according to the configuration signaling; and receiving, by the network side, the feedback information, corresponding to the downlink data, transmitted by the UE according to a result of determination after transmitting the downlink data to the UE.

In the solution according to the embodiment of the invention, at the network side, the network side transmits the configuration signaling to the UE and determines at least one uplink carrier for transmitting by the UE feedback information corresponding to downlink data, according to the configuration signaling; and the eNB receives the feedback information, corresponding to the downlink data, transmitted by the UE according to a result of determination after transmitting the downlink data to the UE. As can be apparent, this method enables a solution to receiving by the network side feedback information, corresponding to downlink data, fed back by the UE, applicable to carrier aggregation with at least one TDD carrier and at least one FDD carrier, so as to address the problem of how to receive feedback information in the case of carrier aggregation with at least one TDD carrier and at least one FDD carrier.

Preferably when the TDD duplex mode is applied to downlink carriers in a group, the same TDD uplink/downlink configuration is applied to all the downlink carriers in the group.

Preferably determining, by the network side, the at least one uplink carrier for transmitting by the UE the feedback information corresponding to the downlink data, according to the configuration signaling is performed by determining that the feedback information corresponding to the downlink data transmitted in a group is to be transmitted over the uplink carrier configured for the group.

Preferably determining, by the network side, the at least one uplink carrier for transmitting by the UE the feedback information corresponding to the downlink data, according to the configuration signaling is performed by determining that the feedback information corresponding to all the downlink data transmitted in first category of groups is to be transmitted over an uplink carrier C' in an uplink subframe n by the UE, wherein the first category consists of any group for which feedback information is to be transmitted in the uplink subframe n; and the uplink carrier C' is an uplink carrier configured for a group with the highest priority in the first category.

Furthermore the configuration signaling further indicates priority information of each group; and the network side determines the priority of the at least one group of the first category according to the configuration signaling; or the network side determines the priority of the at least one group of the first category as the eNB prescribes with the UE.

A UE includes:

a receiving unit configured to receive configuration signaling transmitted by the network side, wherein the configuration signaling indicates information about grouping of M downlink carriers aggregated in the carrier aggregation into N groups, wherein each group includes at least one downlink carrier among the M downlink carriers, and the same duplex mode is applied to downlink carriers belonging to a group; and the configuration signaling further configures each group with an uplink carrier, wherein the same duplex mode as a downlink carrier in a group is applied to the uplink carrier configured for the group; and M represents a positive integer, and N represents a positive integer no more than M;

a determining unit configured to determine at least one uplink carrier for transmitting feedback information corresponding to downlink data, according to the configuration signaling; and a transmitting unit configured to receive the downlink data and to transmit the feedback information corresponding to the downlink data to the network side according to a result of determination.

The UE according to the embodiment of the invention receives configuration signaling transmitted by the network side, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M; the UE determines at least one uplink carrier for transmitting feedback information corresponding to downlink data, according to the configuration signaling; and the UE transmits the feedback information corresponding to the downlink data to the network side according to a result of determination upon reception of the downlink data. As can be apparent, this UE enables a solution to transmitting by the UE feedback information corresponding to downlink data, applicable to carrier aggregation with at least one TDD carrier and at least one FDD carrier, so as to address the problem of how to transmit feedback information in the case of carrier aggregation with at least one TDD carrier and at least one FDD carrier.

Preferably when the TDD duplex mode is applied to downlink carriers in a group indicated by the configuration signaling received by the receiving unit, the same TDD uplink/downlink configuration is applied to all the downlink carriers in the group.

Preferably the determining unit is configured to determine that the feedback information corresponding to the downlink data transmitted in a group is to be transmitted over the uplink carrier configured for the group.

Preferably the determining unit is configured to determine that the feedback information corresponding to all the downlink data transmitted in the first category of groups is to be transmitted over an uplink carrier C' in an uplink subframe n, wherein the first category consists of any group for which feedback information is to be transmitted in the uplink subframe n; and the uplink carrier C' is an uplink carrier configured for a group with the highest priority in the first category.

Furthermore the configuration signaling received by the receiving unit 70 further indicates priority information of each group; and the determining unit is further configured to determine the priority of the at least one group of the first category according to the configuration signaling; or the determining unit is further configured to determine the priority of the at least one group of the first category as the UE prescribes with the network side.

Based upon the same inventive idea as the method, an embodiment of the invention further provides a UE including a radio frequency unit and a processor, wherein:

The radio frequency unit is configured to receive configuration signaling transmitted by the network side, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M;

the processor is configured to determine at least one uplink carrier for transmitting feedback information corresponding to downlink data, according to the configuration signaling; and the radio frequency unit is further configured to receive the downlink data and to transmit the feedback information corresponding to the downlink data to the network side according to a result of determination.

As can be apparent, this UE enables a solution to transmitting by the UE feedback information corresponding to downlink data, applicable to carrier aggregation with at least one TDD carrier and at least one FDD carrier, so as to address the problem of how to transmit feedback information in the case of carrier aggregation with at least one TDD carrier and at least one FDD carrier.

An eNB includes:

a transmitting unit configured to transmit configuration signaling to a UE, wherein the configuration signaling indicates information about grouping of M downlink carriers aggregated in the carrier aggregation into N groups, wherein each group includes at least one downlink carrier among the M downlink carriers, and the same duplex mode is applied to downlink carriers belonging to a group; and the configuration signaling further configures each group with an uplink carrier, wherein the same duplex mode as a downlink carrier in a group is applied to the uplink carrier configured for the group; and M represents a positive integer, and N represents a positive integer no more than M;

a determining unit configured to determine at least one uplink carrier for transmitting by the UE feedback information corresponding to downlink data, according to the configuration signaling; and a receiving unit configured to receive the feedback information, corresponding to the downlink data, transmitted by the UE according to a result of determination after transmitting the downlink data to the UE.

The eNB according to the embodiment of the invention transmits configuration signaling to the UE and determines at least one uplink carrier for transmitting by the UE feedback information corresponding to downlink data, according to the configuration signaling; and the eNB receives the feedback information, corresponding to the downlink data, transmitted by the UE according to a result of determination after transmitting the downlink data to the UE. As can be apparent, this eNB enables a solution to receiving by the network side feedback information, corresponding to downlink data, fed back by the UE, applicable to carrier aggregation with at least one TDD carrier and at least one FDD carrier, so as to address the problem of how to receive feedback information in the case of carrier aggregation with at least one TDD carrier and at least one FDD carrier.

Preferably when the TDD duplex mode is applied to downlink carriers in a group indicated in the configuration signaling transmitted by the transmitting unit, the same TDD uplink/downlink configuration is applied to all the downlink carriers in the group.

Preferably the determining unit is configured to determine that the feedback information corresponding to the downlink data transmitted in a group is to be transmitted over the uplink carrier configured for the group.

Preferably the determining unit is configured to determine that the feedback information corresponding to all the downlink data transmitted in the first category of groups is to be transmitted over an uplink carrier C' in an uplink subframe n by the UE, wherein the first category consists of any group for which feedback information is to be transmitted in the uplink subframe n; and the uplink carrier C' is an uplink carrier configured for a group with the highest priority in the first category.

Furthermore the configuration signaling transmitted by the transmitting unit further indicates priority information of each group; and the determining unit is further configured to determine the priority of each group in the first category according to the configuration signaling; or the determining unit is further configured to determine the priority of each group in the first category as the eNB prescribes with the UE.

Based upon the same inventive idea as the method, an embodiment of the invention further provides an eNB including a radio frequency unit and a processor.

The radio frequency unit is configured to transmit configuration signaling to a UE, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M;

the processor is configured to determine at least one uplink carrier for transmitting by the UE feedback information corresponding to downlink data, according to the configuration signaling; and the radio frequency unit is further configured to receive the feedback information, corresponding to the downlink data, transmitted by the UE according to a result of determination after transmitting the downlink data to the UE.

The eNB according to the embodiment of the invention transmits configuration signaling to the UE and determines at least one uplink carrier for transmitting by the UE feedback information corresponding to downlink data, according to the configuration signaling; and the eNB receives the feedback information, corresponding to the downlink data, transmitted by the UE according to a result of determination after transmitting the downlink data to the UE. As can be apparent, this eNB enables a solution to receiving by the network side feedback information, corresponding to downlink data, fed back by the UE, applicable to carrier aggregation with at least one TDD carrier and at least one FDD carrier, so as to address the problem of how to receive feedback information in the case of carrier aggregation with at least one TDD carrier and at least one FDD carrier.

DETAILED DESCRIPTION OF THE EMBODIMENTS

In order to address the problem of how to transmit feedback information for downlink data when a Time Division Duplex (TDD) carrier is aggregated with a Frequency Division Duplex (FDD) carrier, embodiments of the invention provide a method for transmitting feedback information, applicable to carrier aggregation with at least one TDD carrier and at least one FDD carrier.

Figure 1A:
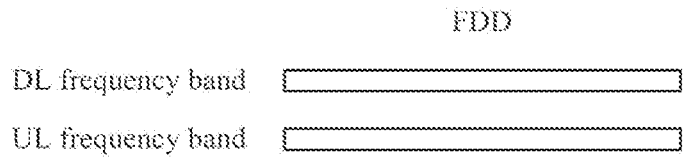
FIG. 1A illustrates a schematic diagram of the FDD in the prior art.
Figure 1B:
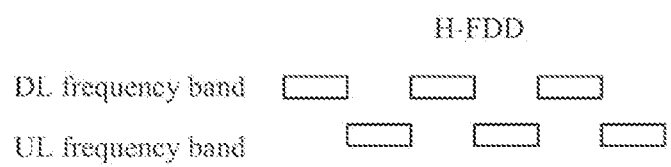
FIG. 1B illustrates a schematic diagram of the H-FDD in the prior art.
Figure 1C:
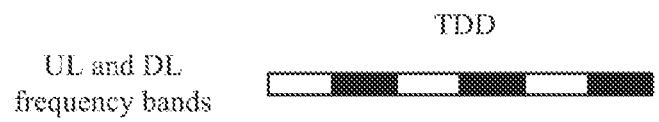
FIG. 1C illustrates a schematic diagram of the TDD in the prior art.
Figure 2:
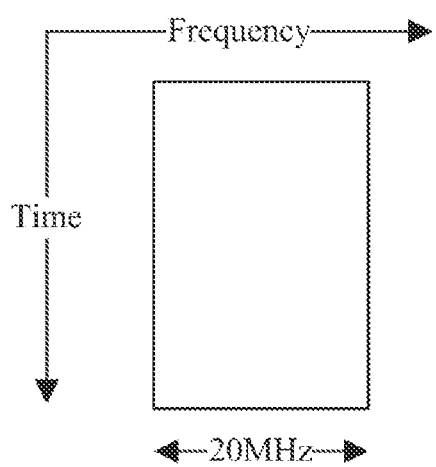
FIG. 2 illustrates a schematic diagram of carrier distribution of the LTE cell in the prior art.
Figure 3:
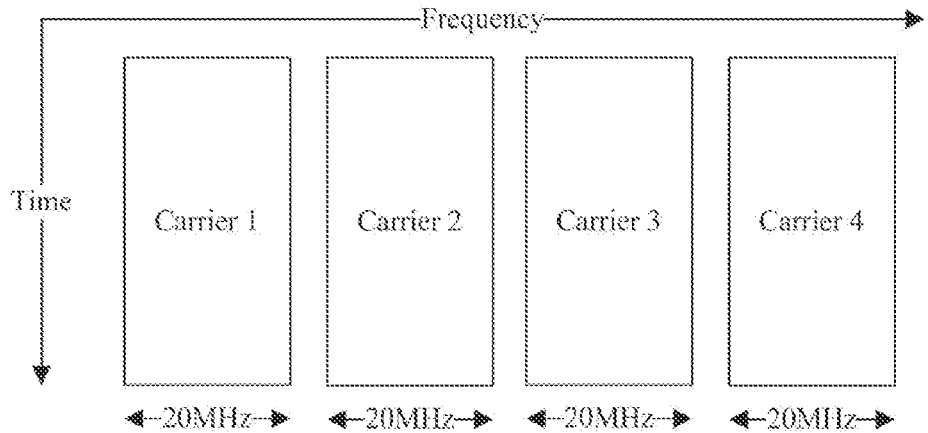
FIG. 3 illustrates a schematic diagram of carrier aggregation in the prior art.
Figure 4:
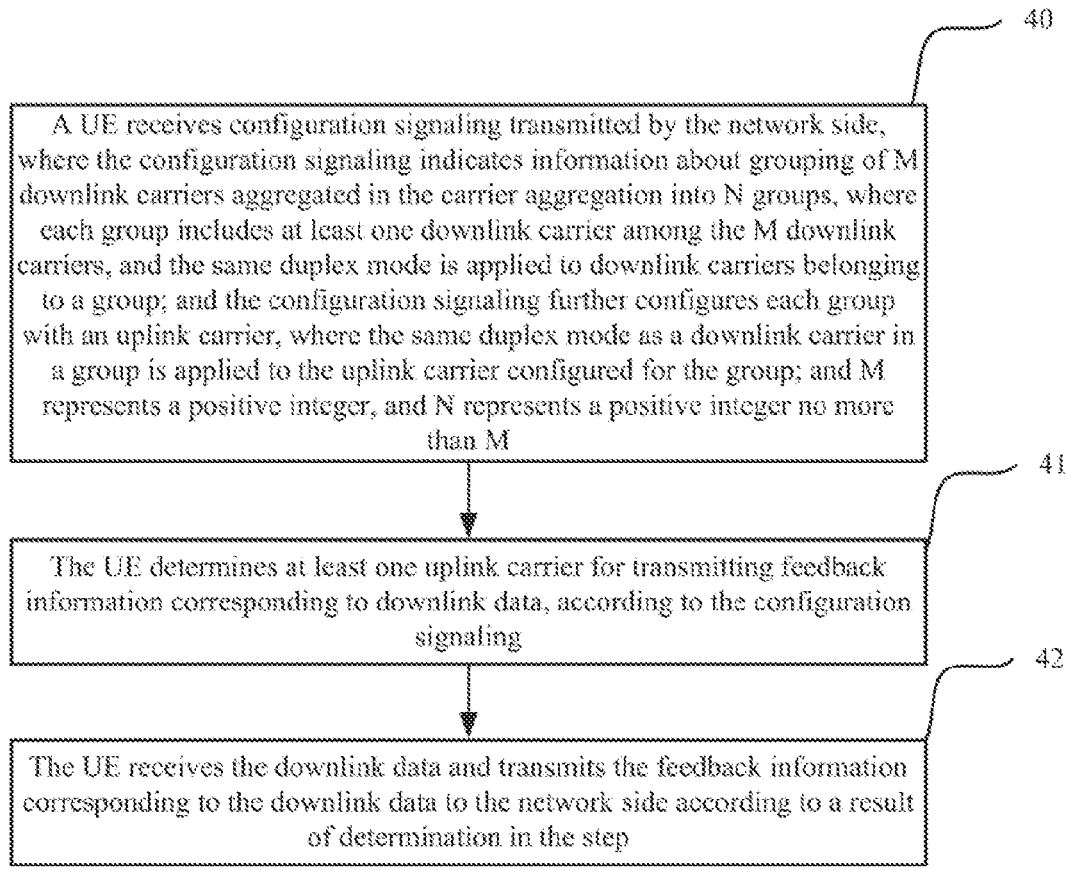
FIG. 4 illustrates a schematic flow chart of a method according to an embodiment of the invention.

Referring to FIG. 4, a method for transmitting feedback information, applicable to carrier aggregation with at least one TDD carrier and at least one FDD carrier, according to an embodiment of the invention includes the following steps:

Step 40. A UE receives configuration signaling transmitted by the network side, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M;

It shall be noted that for a TDD carrier, a downlink carrier and an uplink carrier are the same carrier, and for an FDD carrier, a downlink carrier and an uplink carrier are different carriers;

Step 41. The UE determines at least one uplink carrier for transmitting feedback information corresponding to downlink data, according to the configuration signaling; and Step 42. The UE receives the downlink data and transmits the feedback information corresponding to the downlink data to the network side according to a result of determination in the step 41.

Furthermore when the TDD duplex mode is applied to downlink carriers in a group, the same TDD uplink/downlink configuration is applied to all the downlink carriers in the group. Every two groups do not include any duplicate downlink carrier.

Here the UE can determine the at least one uplink carrier for transmitting the feedback information corresponding to the downlink data, according to the configuration signaling in the step 41 particularly in the following two approaches:

In a first approach, it is determined that the feedback information corresponding to the downlink data transmitted in a group is to be transmitted over the uplink carrier configured for the group; and accordingly in the step 42, the UE transmits the feedback information corresponding to the downlink data over the uplink carrier configured for the group to which a downlink carrier, over which the downlink data is received, belongs, upon reception of the downlink data.

In a second approach, it is determined that the feedback information corresponding to all the downlink data transmitted in the first category of groups is to be transmitted over an uplink carrier C' in an uplink subframe n; and here the first category consists of any group for which feedback information is to be transmitted in the uplink subframe n; and the uplink carrier C' is an uplink carrier configured for a group with the highest priority in the first category. Here the group for which feedback information is to be transmitted in the uplink subframe n refers to a group including downlink carriers for which feedback information is to be transmitted in the uplink subframe n, and it is determined as follows whether feedback information is to be transmitted in the uplink subframe n for a downlink carrier; for an FDD carrier, feedback information is to be transmitted in all the uplink subframes; for a TDD carrier, as can be apparent from Table 2 and the relevant description in the Background section:

In the TDD uplink/downlink configuration 0, feedback information is to be transmitted in the uplink subframes 2/4/7/9;

In the TDD uplink/downlink configuration 1, feedback information is to be transmitted in the uplink subframes 2/3/7/8;

In the TDD uplink/downlink configuration 2, feedback information is to be transmitted in the uplink subframes 2/7;

In the TDD uplink/downlink configuration 3, feedback information is to be transmitted in the uplink subframes 2/3/4;

In the TDD uplink/downlink configuration 4, feedback information is to be transmitted in the uplink subframes 2/3;

In the TDD uplink/downlink configuration 5, feedback information is to be transmitted in the uplink subframe 2; and In the TDD uplink/downlink configuration 6, feedback information is to be transmitted in the uplink subframes 2/4/7/8/9; and Accordingly in the step 42, the UE determines the uplink subframe for transmitting the feedback information corresponding to the downlink data, according to the downlink carrier in which the downlink data is received, upon reception of the downlink data; and then transmits the feedback information corresponding to the received downlink data over the uplink carrier corresponding to the group with the highest priority among all the groups over which the feedback information is transmitted in the uplink subframe.

Furthermore the configuration signaling further indicates priority information of each group, and the UE determines the priority of each group in the first category according to the configuration signaling; or The UE determines the priority of each group in the first category as the UE prescribes with the network side.

Figure 5:
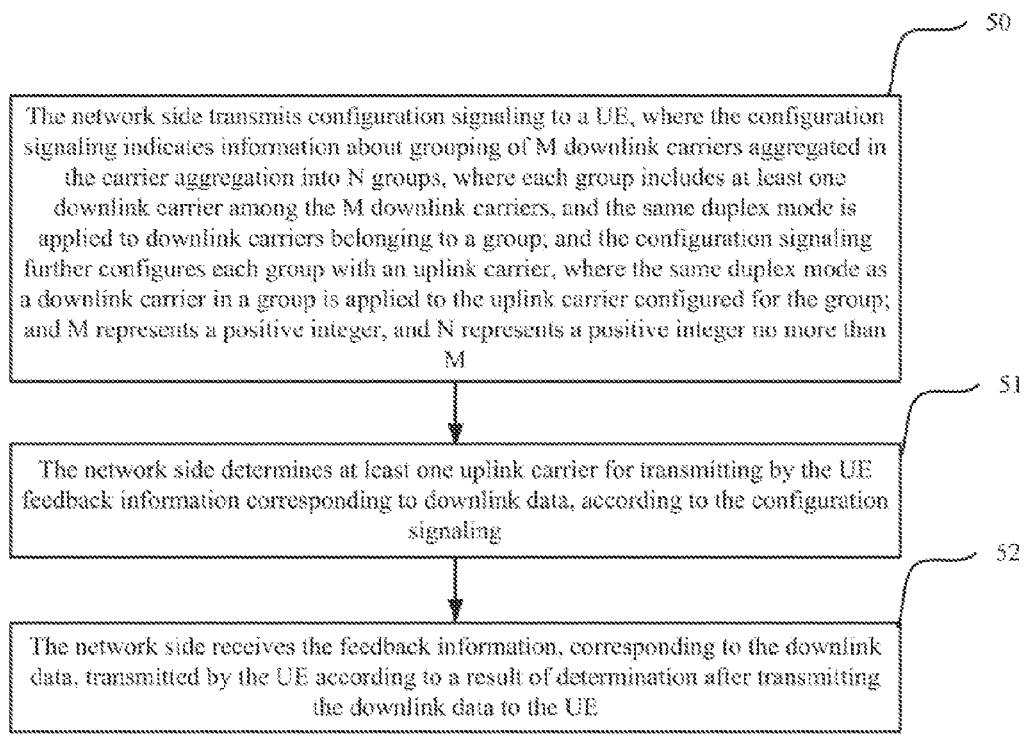
FIG. 5 illustrates a schematic flow chart of another method according to an embodiment of the invention.

Referring to FIG. 5, an embodiment of the invention provides a method for receiving feedback information, applicable to carrier aggregation with at least one TDD carrier and at least one FDD carrier, and the method includes the following steps:

Step 50. The network side transmits configuration signaling to a UE, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M;

Step 51. The network side determines at least one uplink carrier for transmitting by the UE feedback information corresponding to downlink data, according to the configuration signaling; and Step 52. The network side receives the feedback information, corresponding to the downlink data, transmitted by the UE according to a result of determination after transmitting the downlink data to the UE.

Furthermore when the TDD duplex mode is applied to downlink carriers in a group, the same TDD uplink/downlink configuration is applied to all the downlink carriers in the group. Every two groups do not include any duplicate downlink carrier.

Here the network side can determine the at least one uplink carrier for transmitting by the UE the feedback information corresponding to the downlink data, according to the configuration signaling in the step 51 particularly in the following two approaches:

In a first approach, it is determined that the feedback information corresponding to the downlink data transmitted in a group is to be transmitted over the uplink carrier configured for the group; and accordingly in the step 52, the network side receives the feedback information corresponding to the downlink data over the uplink carrier configured for the group to which a downlink carrier, over which the downlink data is transmitted, belongs, upon transmitting the downlink data.

In a second approach, it is determined that the feedback information corresponding to all the downlink data transmitted in the first category of groups is to be transmitted over an uplink carrier C' in an uplink subframe n by the UE; and here the first category consists of any group for which feedback information is to be transmitted in the uplink subframe n; and the uplink carrier C' is an uplink carrier configured for a group with the highest priority in the first category. Accordingly in the step 52, after the downlink data is transmitted, the network side determines the uplink subframe for transmitting by the UE the feedback information corresponding to the downlink data, according to the downlink carrier over which the downlink data is transmitted; and then receives the feedback information, corresponding to the downlink data, fed back by the UE, over the uplink carrier corresponding to the group with the highest priority among all the groups for transmitting the feedback information in the uplink subframe.

Furthermore the configuration signaling further indicates priority information of each group, and the network side determines the priority of each group in the first category according to the configuration signaling; or The network side determines the priority of each group in the first category as the network side prescribes with the UE.

The feedback information in the invention can include ACK/NACK information.

The invention will be described below in details.

The eNB groups M downlink carriers aggregated in the carrier aggregation into N groups $S_i$, where M represents a positive integer more than 1, $1 < N \leq M$, $i=1, \ldots, N$, and a downlink carrier belongs to only one group, and the same duplex mode is applied to all the downlink carriers in a group, that is, all the downlink carriers in a group are FDD carriers or TDD carriers. Furthermore the same TDD uplink/downlink configuration is applied to all the TDD carriers in a group.

Figure 6:
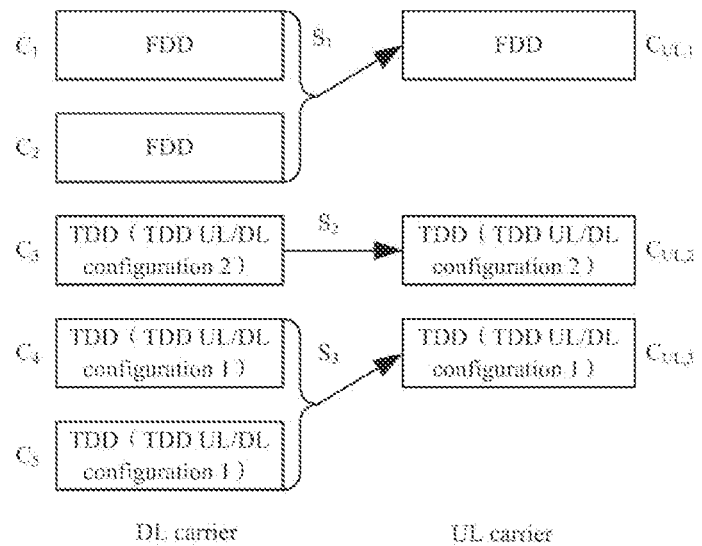
FIG. 6 illustrates a schematic diagram of grouped downlink carriers according to an embodiment of the invention.

The eNB configures the group $S_i$ with an uplink carrier $C_{UL,i}$, where $i=1, \ldots, N$, a duplex mode applied to the uplink carrier $C_{UL,i}$ is the same as the duplex mode applied to the corresponding group $S_i$, and the uplink carriers applied to the different groups are different from each other, as illustrated in FIG. 6. Furthermore the TDD uplink/downlink configuration applied to the uplink carrier is the same as the TDD uplink/downlink configuration applied to the corresponding group.

First Approach:

The UE receives the configuration signaling of the eNB and determines N groups $S_i$ into which M downlink carriers are grouped, and uplink carriers $C_{UL,i}$ corresponding to the respective groups;

The UE receives downlink data over the downlink carriers in the group $S_i$, where $i=1, \ldots, N$, decodes the downlink data, and obtains corresponding ACK/NACK information; and The UE transmits the ACK/NACK information corresponding to the downlink data received in the downlink carriers in the group $S_i$, over the uplink carrier $C_{UL,i}$.

The ACK/NACK can be fed back particularly as in the LTE Rel-11 carrier aggregation system so that the ACK/NACK information corresponding to the plurality of downlink carriers over the uplink carrier $C_{UL,i}$, although a repeated description thereof will be omitted here.

First Embodiment

There are five carriers C1, C2, C3, C4 and C5 aggregated in the system, where C1 and C2 are FDD carriers (which are pairs of carriers, that is, C1 corresponds to a downlink carrier and an uplink carrier), and C3 to C5 are TDD carriers. The eNB groups the five carriers into two groups, where S1={C1, C2}, and S2={C3 C4, C5}. The eNB determines an uplink carrier corresponding to the group S1 as C1, and an uplink carrier corresponding to S2 as C3.

The UE receives downlink data over the downlink carriers C1 and C2, obtains corresponding ACK/NACK information, and transmits the ACK/NACK information over the uplink carrier C1. The UE receives downlink data over the downlink carriers C3, C4 and C5, obtains corresponding ACK/NACK information, and transmits the ACK/NACK information over the uplink carrier C3.

Second Embodiment

There are five carriers C1, C2, C3, C4 and C5 aggregated in the system, where C and C2 are FDD carriers (which are pairs of carriers, that is, C1 corresponds to a downlink carrier and an uplink carrier), and C3 to C5 are TDD carriers; and the TDD uplink/downlink configuration 2 is applied to C3, and the TDD uplink/downlink configuration 1 is applied to C4 and C5. The eNB groups the five carriers into three groups, where S1={C1, C2}, S2={C3}, and S3={C4, C5}. The eNB determines an uplink carrier corresponding to the group S1 as C1, an uplink carrier corresponding to S2 as C3, and an uplink carrier corresponding to S3 as C4.

Processing at the UE is similar to the first embodiment, so a repeated description thereof will be omitted here.

Second Approach:

The UE receives the configuration signaling of the eNB and determines N groups $S_i$ into which M downlink carriers are grouped, and uplink carriers $C_{UL,i}$ corresponding to the respective groups;

The UE determines a priority of the group $S_i$, where $i=1, \ldots, N$, and the priority can be notified by the eNB or can be predefined in the standard; and The UE transmits ACK/NACK information corresponding to all downlink data transmitted in the first category of groups, over an uplink carrier $C'_{UL}$ in an uplink subframe n; and the first category consists of any group for which ACK/NACK information is transmitted in the uplink subframe n; and the uplink carrier $C'_{UL}$ is an uplink carrier configured for a group with the highest priority in the first category.

The ACK/NACK can be fed back particularly as in the LTE Rel-11 carrier aggregation system so that the ACK/NACK information corresponding to the plurality of downlink carriers over the uplink carrier $C'_{UL}$, although a repeated description thereof will be omitted here.

Third Embodiment

Like the second embodiment, the priorities of the groups are ranked in the order of S2 (corresponding to the uplink carrier C3)>S3 (corresponding to the uplink carrier C4)>S1 (corresponding to the uplink carrier C1). If ACK/NACK information for the group S1 is transmitted in the uplink subframes 0 to 9, ACK/NACK information for the group S2 is transmitted in the uplink subframes 2 and 7, and ACK/NACK information for the group S3 is transmitted in the uplink subframes 2, 3, 7 and 8, then:

The UE transmits the ACK/ACK information corresponding to the groups S1, S2 and S3 over the uplink carrier C3 in the uplink subframes 2 and 7;

The UE transmits the ACK/NACK information corresponding to the groups S1 and S3 over the uplink carrier C4 in the uplink subframes 3 and 8;

The UE transmits the ACK/NACK information corresponding to the group S1 over the uplink carrier C1 in the uplink subframes 0, 1, 4, 5, 6 and 9; and Furthermore if the UE sets the priority of the group $S_i$ at the priority P, where $1 \le P \le N$, then each of the priorities 1 to P−1 corresponds to only one of the groups, and the priority P corresponds to the (N−P+1)-th group.

When ACK/NACK information is transmitted in the uplink subframe n for all of a number a of groups at the priority P, where $a \le N-P+1$, and there is no ACK/NACK information transmitted in the uplink subframe n for any group at a higher priority, the UE transmits the ACK/NACK information of the respective groups respectively a number a of uplink carriers corresponding to the number a of groups.

Fourth Embodiment

Like the second embodiment, the priorities of the groups are ranked in the order of S2 (corresponding to the uplink carrier C3)>S3 (corresponding to the uplink carrier C4)>S1 (corresponding to the uplink carrier C1). If ACK/NACK information for the group S1 is transmitted in the uplink subframes 0 to 9, ACK/NACK information for the group S2 is transmitted in the uplink subframes 2 and 7, and ACK/NACK information for the group S3 is transmitted in the uplink subframes 2, 3, 7 and 8, then:

The UE transmits the ACK/NACK information corresponding to the groups S1, S2 and S3 over the uplink carrier C3 in the uplink subframes 2 and 7;

The UE transmits the ACK/NACK information corresponding to the groups S1 and S3 over the uplink carrier C4 in the uplink subframes 3 and 8;

The UE transmits the ACK/NACK information corresponding to the group S1 over the uplink carrier C1 in the uplink subframes 0, 1, 4, 5, 6 and 9.

Figure 7:
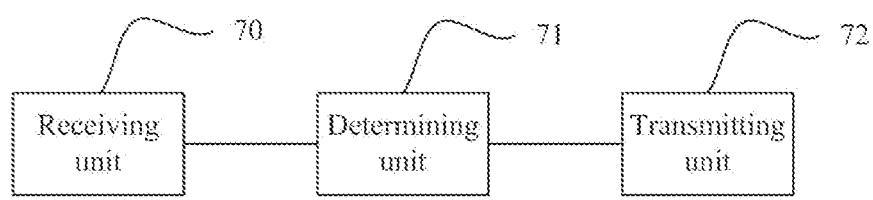
FIG. 7 illustrates a schematic diagram of a UE according to an embodiment of the invention.

Referring to FIG. 7, an embodiment of the invention further provides a UE including:

A receiving unit 70 is configured to receive configuration signaling transmitted by the network side, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M;

A determining unit 71 is configured to determine at least one uplink carrier for transmitting feedback information corresponding to downlink data, according to the configuration signaling; and A transmitting unit 72 is configured to receive the downlink data and to transmit the feedback information corresponding to the downlink data to the network side according to a result of determination.

Furthermore when the TDD duplex mode is applied to downlink carriers in a group indicated by the configuration signaling received by the receiving unit 70, the same TDD uplink/downlink configuration is applied to all the downlink carriers in the group.

Furthermore the determining unit 71 is configured:

To determine that the feedback information corresponding to the downlink data transmitted in a group is to be transmitted over the uplink carrier configured for the group.

Furthermore the determining unit 71 is configured:

To determine that the feedback information corresponding to all the downlink data transmitted in the first category of groups is to be transmitted over an uplink carrier C' in an uplink subframe n, where the first category consists of any group for which feedback information is to be transmitted in the uplink subframe n; and the uplink carrier C' is an uplink carrier configured for a group with the highest priority in the first category.

Furthermore the configuration signaling received by the receiving unit 70 further indicates priority information of each group; and the determining unit 71 is further configured to determine the priority of each group in the first category according to the configuration signaling; or The determining unit 71 is further configured to determine the priority of each group in the first category as the UE prescribes with the network side.

Based upon the same inventive idea as the method, an embodiment of the invention provides a UE including a radio frequency unit and a processor.

The radio frequency unit is configured to receive configuration signaling transmitted by the network side, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M;

The processor is configured to determine at least one uplink carrier for transmitting feedback information corresponding to downlink data, according to the configuration signaling; and The radio frequency unit is further configured to receive the downlink data and to transmit the feedback information corresponding to the downlink data to the network side according to a result of determination.

As can be apparent, this UE enables a solution to transmitting by the UE feedback information corresponding to downlink data, applicable to carrier aggregation with at least one TDD carrier and at least one FDD carrier, so as to address the problem of how to transmit feedback information in the case of carrier aggregation with at least one TDD carrier and at least one FDD carrier.

Figure 8:
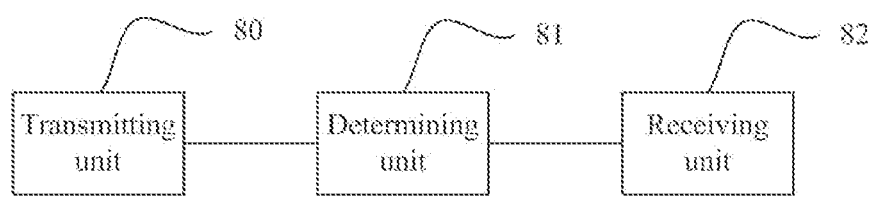
FIG. 8 illustrates a schematic diagram of an eNB according to an embodiment of the invention.

Referring to FIG. 8, an embodiment of the invention further provides an eNB including:

A transmitting unit 80 is configured to transmit configuration signaling to a UE, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M;

A determining unit 81 is configured to determine at least one uplink carrier for transmitting by the UE feedback information corresponding to downlink data, according to the configuration signaling; and A receiving unit 82 is configured to receive the feedback information, corresponding to the downlink data, transmitted by the UE according to a result of determination after transmitting the downlink data to the UE.

Furthermore when the TDD duplex mode is applied to downlink carriers in a group indicated in the configuration signaling transmitted by the transmitting unit 80, the same TDD uplink/downlink configuration is applied to all the downlink carriers in the group.

Furthermore the determining unit 81 is configured:

To determine that the feedback information corresponding to the downlink data transmitted in a group is to be transmitted over the uplink carrier configured for the group by the UE.

Furthermore the determining unit 81 is configured:

To determine that the feedback information corresponding to all the downlink data transmitted in the first category of groups is to be transmitted over an uplink carrier C' in an uplink subframe n, where the first category consists of any group for which feedback information is to be transmitted in the uplink subframe n; and the uplink carrier C' is an uplink carrier configured for a group with the highest priority in the first category.

Furthermore the configuration signaling transmitted by the transmitting unit 80 further indicates priority information of each group; and the determining unit 81 is further configured to determine the priority of each group in the first category according to the configuration signaling; or The determining unit 81 is further configured to determine the priority of each group in the first category as the eNB prescribes with the UE.

Based upon the same inventive idea as the invention, an embodiment of the invention further provides an eNB including a radio frequency unit and a processor.

The radio frequency unit is configured to transmit configuration signaling to a UE, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M;

The processor is configured to determine at least one uplink carrier for transmitting by the UE feedback information corresponding to downlink data, according to the configuration signaling; and The radio frequency unit is further configured to receive the feedback information, corresponding to the downlink data, transmitted by the UE according to a result of determination after transmitting the downlink data to the UE.

The eNB according to the embodiment of the invention transmits configuration signaling to the UE and determines at least one uplink carrier for transmitting by the UE feedback information corresponding to downlink data, according to the configuration signaling; and the eNB receives the feedback information, corresponding to the downlink data, transmitted by the UE according to a result of determination after transmitting the downlink data to the UE. As can be apparent, this eNB enables a solution to receiving by the network side feedback information, corresponding to downlink data, fed back by the UE, applicable to carrier aggregation with at least one TDD carrier and at least one FDD carrier, so as to address the problem of how to receive feedback information in the case of carrier aggregation with at least one TDD carrier and at least one FDD carrier.

In summary, advantageous effects of the invention include:

In the solution according to the embodiment of the invention, at the UE side, the UE receives configuration signaling transmitted by the network side, where the configuration signaling indicates information about grouping of M downlink carriers aggregated in the carrier aggregation into N groups, where each group includes at least one downlink carrier among the M downlink carriers, and the same duplex mode is applied to downlink carriers belonging to a group; and the configuration signaling further configures each group with an uplink carrier, where the same duplex mode as a downlink carrier in a group is applied to the uplink carrier configured for the group; and M represents a positive integer, and N represents a positive integer no more than M; the UE determines at least one uplink carrier for transmitting feedback information corresponding to downlink data, according to the configuration signaling; and the UE transmits the feedback information corresponding to the downlink data to the network side according to a result of determination upon reception of the downlink data. As can be apparent, this method enables a solution to transmitting by the UE feedback information corresponding to downlink data, applicable to carrier aggregation with at least one TDD carrier and at least one FDD carrier, so as to address the problem of how to transmit feedback information in the case of carrier aggregation with at least one TDD carrier and at least one FDD carrier.

At the network side, the network side transmits the configuration signaling to the UE and determines at least one uplink carrier for transmitting by the UE feedback information corresponding to downlink data, according to the configuration signaling; and the eNB receives the feedback information, corresponding to the downlink data, transmitted by the UE according to a result of determination after transmitting the downlink data to the UE. As can be apparent, this method enables a solution to receiving by the network side feedback information, corresponding to downlink data, fed back by the UE, applicable to carrier aggregation with at least one TDD carrier and at least one FDD carrier, so as to address the problem of how to receive feedback information in the case of carrier aggregation with at least one TDD carrier and at least one FDD carrier.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting feedback information, applicable to carrier aggregation with at least one Time Division Duplex (TDD) carrier and at least one Frequency Division Duplex (FDD) carrier, the method comprising:
   receiving, by a UE, configuration signaling transmitted by the network side, wherein the configuration signaling indicates information about grouping of M downlink carriers aggregated in the carrier aggregation into N groups, wherein each group comprises at least one downlink carrier among the M downlink carriers, and the same duplex mode is applied to downlink carriers belonging to a group; and the configuration signaling further configures each group with an uplink carrier, wherein the same duplex mode as a downlink carrier in a group is applied to the uplink carrier configured for the group; and M represents a positive integer, and N represents a positive integer no more than M;
   determining, by the UE, at least one uplink carrier for transmitting feedback information corresponding to downlink data, according to the configuration signaling; and
   receiving, by the UE, the downlink data and transmitting the feedback information corresponding to the downlink data to the network side according to a result of determination;
   wherein determining the at least one uplink carrier for transmitting the feedback information corresponding to the downlink data, according to the configuration signaling comprises:
   determining that the feedback information corresponding to all the downlink data transmitted in first category of groups is to be transmitted over an uplink carrier C' in an uplink subframe n, wherein the first category consists of any group for which feedback information is to be transmitted in the uplink subframe n; and the uplink carrier C' is an uplink carrier configured for a group with the highest priority in the first category.

2. The method according to claim 1, wherein when the TDD duplex mode is applied to downlink carriers in a group, the same TDD uplink/downlink configuration is applied to all the downlink carriers in the group.

3. The method according to claim 1, wherein determining the at least one uplink carrier for transmitting the feedback information corresponding to the downlink data, according to the configuration signaling comprises:
   determining that the feedback information corresponding to the downlink data transmitted in a group is to be transmitted over the uplink carrier configured for the group.

4. The method according to claim 1, wherein the configuration signaling further indicates priority information of each group; and the UE determines the priority of each group in the first category, according to the configuration signaling; or
   the UE determines the priority of each group in the first category as the UE prescribes with the network side.

5. A method for receiving feedback information, applicable to carrier aggregation with at least one Time Division Duplex (TDD) carrier and at least one Frequency Division Duplex (FDD) carrier, the method comprising:
   transmitting, by the network side, configuration signaling to a UE, wherein the configuration signaling indicates information about grouping of M downlink carriers aggregated in the carrier aggregation into N groups, wherein each group comprises at least one downlink carrier among the M downlink carriers, and the same duplex mode is applied to downlink carriers belonging to a group; and the configuration signaling further configures each group with an uplink carrier, wherein the same duplex mode as a downlink carrier in a group is applied to the uplink carrier configured for the group; and M represents a positive integer, and N represents a positive integer no more than M;
   determining, by the network side, at least one uplink carrier for transmitting by the UE feedback information corresponding to downlink data, according to the configuration signaling; and receiving, by the network side, the feedback information, corresponding to the downlink data, transmitted by the UE according to a result of determination after transmitting the downlink data to the UE;

wherein determining, by the network side, the at least one uplink carrier for transmitting by the UE the feedback information corresponding to the downlink data, according to the configuration signaling comprises:

determining that the feedback information corresponding to all the downlink data transmitted in first category of groups is to be transmitted over an uplink carrier C' in an uplink subframe n by the UE, wherein the first category consists of any group for which feedback information is to be transmitted in the uplink subframe n; and the uplink carrier C' is an uplink carrier configured for a group with the highest priority in the first category.

6. The method according to claim 5, wherein when the TDD duplex mode is applied to downlink carriers in a group, the same TDD uplink/downlink configuration is applied to all the downlink carriers in the group.

7. The method according to claim 5, wherein determining, by the network side, the at least one uplink carrier for transmitting by the UE the feedback information corresponding to the downlink data, according to the configuration signaling comprises:

determining that the feedback information corresponding to the downlink data transmitted in a group is to be transmitted over the uplink carrier configured for the group.

8. The method according to claim 5, wherein the configuration signaling further indicates priority information of each group; and the network side determines the priority of each group in the first category according to the configuration signaling; or the network side determines the priority of each group in the first category as the eNB prescribes with the UE.

9. A UE, comprising:

a receiving unit configured to receive configuration signaling transmitted by the network side, wherein the configuration signaling indicates information about grouping of M downlink carriers aggregated in the carrier aggregation into N groups, wherein each group comprises at least one downlink carrier among the M downlink carriers, and the same duplex mode is applied to downlink carriers belonging to a group; and the configuration signaling further configures each group with an uplink carrier, wherein the same duplex mode as a downlink carrier in a group is applied to the uplink carrier configured for the group; and M represents a positive integer, and N represents a positive integer no more than M;

a determining unit configured to determine at least one uplink carrier for transmitting feedback information corresponding to downlink data, according to the configuration signaling; and a transmitting unit configured to receive the downlink data and to transmit the feedback information corresponding to the downlink data to the network side according to a result of determination;

the determining unit is further configured to determine that the feedback information corresponding to all the downlink data transmitted in first category of groups is to be transmitted over an uplink carrier C' in an uplink subframe n, wherein the first category consists of any group for which feedback information is to be transmitted in the uplink subframe n; and the uplink carrier C' is an uplink carrier configured for a group with the highest priority in the first category.

10. The UE according to claim 9, wherein when the TDD duplex mode is applied to downlink carriers in a group indicated by the configuration signaling received by the receiving unit, the same TDD uplink/downlink configuration is applied to all the downlink carriers in the group.

11. The UE according to claim 9, wherein the determining unit is configured:

to determine that the feedback information corresponding to the downlink data transmitted in a group is to be transmitted over the uplink carrier configured for the group.

12. The UE according to claim 9, wherein the configuration signaling received by the receiving unit further indicates priority information of each group; and the determining unit is further configured to determine the priority of each group in the first category according to the configuration signaling; or the determining unit is further configured to determine the priority of each group in the first category as the UE prescribes with the network side.

* * * * *